(12) United States Patent
Fu et al.

(45) Date of Patent: Oct. 21, 2025
(10) Patent No.: US 12,449,369 B2

(54) METHOD FOR VISUALLY IDENTIFYING QUALITY OF LILII BULBUS

(71) Applicant: South-Central Minzu University, Wuhan (CN)

(72) Inventors: Haiyan Fu, Wuhan (CN); Liuna Wei, Yizhou (CN); Siyu Wang, Kaifeng (CN); Jian Yang, Beijing (CN); Hengye Chen, Wuhan (CN); Wanjun Long, Yongzhou (CN); Xiaolong Yang, Chongqing (CN)

(73) Assignee: South-Central Minzu University, Wuhan (CN)

( * ) Notice: Subject to any disclaimer, the term of this patent is extended or adjusted under 35 U.S.C. 154(b) by 626 days.

(21) Appl. No.: 17/903,222

(22) Filed: Sep. 6, 2022

(65) Prior Publication Data
US 2023/0102022 A1    Mar. 30, 2023

(30) Foreign Application Priority Data
Sep. 27, 2021 (CN) .......................... 202111137833.9

(51) Int. Cl.
*G01N 21/78* (2006.01)
*G01N 21/25* (2006.01)
*G01N 21/27* (2006.01)

(52) U.S. Cl.
CPC ........... *G01N 21/78* (2013.01); *G01N 21/251* (2013.01); *G01N 21/27* (2013.01)

(58) Field of Classification Search
CPC ...... G01N 21/78; G01N 21/27; G01N 21/251; G01N 21/77; G01N 2021/7786; Y02P 90/30
See application file for complete search history.

(56) References Cited

PUBLICATIONS

Ao et al "A fluorometric biosensor based on functional Au/Ag nanoclusters for real-time monitoring of tyrosinase activity" Biosensors and Bioelectronics 86 (2016) 542â547 (Year: 2016).*

\* cited by examiner

*Primary Examiner* — Dennis White
(74) *Attorney, Agent, or Firm* — Cooper Legal Group, LLC (57) ABSTRACT

Disclosed is a method for visually identifying quality of Lilii Bulbus, including: uniformly mixing an extracting solution of a Lilii Bulbus sample to be detected with gold-silver nanoclusters, standing the mixed extracting solution for reaction, and realizing visual identification of Lilii Bulbus quality according to information of color or information of fluorescence intensity of a detection system obtained after the reaction and response difference of the color or fluorescence of Lilii Bulbus samples with different quality. Compared with that existing detection method based on chromatography and the like, the method provided by the present application has the advantages of high stability, fast response, easy operation and portable devices in addition to a broad application prospect for industrial production.

9 Claims, 6 Drawing Sheets

METHOD FOR VISUALLY IDENTIFYING QUALITY OF LILII BULBUS

CROSS-REFERENCE TO RELATED APPLICATIONS

This application claims priority to Chinese Patent Application No. 202111137833.9, filed on Sep. 27, 2021, the contents of which are hereby incorporated by reference.

TECHNICAL FIELD

The present application belongs to the technical field of chemical analysis and detection, and particularly relates to a method for visually identifying quality of Lilii Bulbus.

BACKGROUND

As a traditional medicinal food product, Lilii Bulbus (*Lilium brownii* var. *Viridulum* Baker) contains various ingredients such as polysaccharides, steroidal saponins and phenolic acids, also has health care functions of nourishing Yin and moistening the lungs, relieving cough and inflammation, clearing the mind and calming the spirit, as well as medicinal efficacies including anti-cancer, anti-depression, anti-aging and enhancing the immunity of the human body. The health and medicinal efficacies of Lilii Bulbus are strongly related to its quality, and the excellent quality of Lilii Bulbus depends upon appropriate geographical and climatic conditions in addition to advanced production and processing techniques. The quality of Lilii Bulbus of different producing areas varies greatly. For instance, the genuine producing areas of "medicinal Lilii Bulbus" are Longhui, Longshan and Xinshao in Hunan province of China, while the genuine producing area of "edible Lilii Bulbus" is Lanzhou in Gansu province. Differences between different Lilii Bulbus of various origins are difficult to distinguish with the naked eye only from their physical appearance, especially for processed Lilii Bulbus.

As a result of various origins with different soil, water, climate and other conditions, Lilii Bulbus shows varies types and different contents of active compounds contained in the Lilii Bulbus, resulted in superior or inferior quality of Lilii bulbi. At present, in quality research of Lilii Bulbus or other herbs, methods of chromatography, near-infrared spectroscopy and others are generally adopted; yet such methods are costly, complicated and time-consuming with requirement of large-scale instruments, which therefore are confined to laboratories and cannot be popularized among general public.

Therefore, it is of great practical importance to develop a convenient method for identifying the quality of Lilii Bulbus quickly and easily with high sensitivity and specificity.

SUMMARY

With regards to the problems and shortcomings of the prior art, the present invention provides a method for visually identifying the quality of Lilii Bulbus, and gold-silver nanoclusters (Au—AgNCs) are used to combine with catechins and other components contained in Lilii Bulbus to produce aggregation-induced emission (AIE) enhancement, and the Lilii Bulbus quality is visually identified by comparing the apparently abundant fluorescence color change produced before and after reaction; the method is easy to popularize and is applicable for industrial production as it is simple, eco-friendly and cost-effective.

To achieve the above objectives, the present application adopts a technical scheme as follows:

the method for visually identifying quality of Lilii Bulbus, including: uniformly mixing an extracting solution of a Lilii Bulbus sample to be detected with Au—AgNCs, standing the mixed extracting solution for reaction, and realizing rapid visual identification of Lilii Bulbus quality according to information of color or information of fluorescence intensity of a detection system obtained after the reaction as well as response difference of the color or fluorescence of Lilii Bulbus samples with different quality.

Optionally, the reaction is carried out for a duration of 1-5 minutes (min).

Optionally, the Au—AgNCs in the detection system is in a concentration of $0.67\text{-}1.67\times10^{-6}$ mole per liter (mol/L); and that concentration of Lilii Bulbus components in the detection system is 3-7 milligrams per milliliter (mg/mL) in terms of Lilii Bulbus raw material introduced as preparing the extracting solution.

Optionally, in the method for visually identifying quality of Lilii Bulbus, the information of color is obtained by means of visual observation or filming equipment, then a visual identification database is obtained for identifying producing areas of high quality (or genuine producing areas) based on the producing areas and growth years of Lilii Bulbus.

Optionally, the filming equipment takes photos under conditions of ultraviolet light irradiation.

Optionally, the fluorescence intensity is detected by a fluorescence spectrophotometer under conditions of emission wavelength of 360-700 nanometers (nm), excitation wavelength of 330-350 nm and slit width of 5-20 nm.

Optionally, the method for visually identifying quality of Lilii Bulbus specifically includes:

1) obtaining the extracting solution of Lilii Bulbus samples to be tested of different producing areas and/or growth years;
2) mixing the Au—AgNCs solution of red fluorescent with the Lilii Bulbus extracting solution to be detected, standing the mixed extracting solution for reaction, then obtaining visualized fluorescent images of the obtained detection system based on effect of AIE; and
3) establishing the visual identification database based on producing areas and/or growth years of Lilii Bulbus according to a relationship between the visualized fluorescent images and producing areas and/or growth years of Lilii Bulbus, thereby realizing an identification of Lilii Bulbus products in high-quality producing areas or growth years.

Optionally, the visual identification database is established as follows:

respectively obtaining RGB (red, green, and blue) values of the visualized fluorescent images obtained from Lilii Bulbus samples of different producing areas and/or growth years, and constructing colorimetric cards corresponding to Lilii Bulbus samples of different producing areas or growth years.

Optionally, the quality of producing areas of the corresponding Lilii Bulbus samples in the colorimetric card varies from high to low in an order of pink-purple-blue.

Optionally, the producing areas of high-quality (or genuine producing areas) are Longya, Longshan, Xinshao of Hunan province, Lanzhou of Gansu province (response resulted in a near-pink color); and the growth years of high-quality is 2-3 growth years.

Optionally, the Au—AgNCs are prepared as follows:
adding bovine serum albumin (BSA) solution into water, then sequentially adding chloroauric acid solution and citrate solution in to the solution-added water, followed by adjusting pH to 4-6, heating the pH-adjusted water in a water bath under darkness, then adding silver salt solution into the heated water for fully reaction, followed by centrifuging and filtering, and then obtaining the Au—AgNCs solution with red fluorescence.

Optionally, the BSA, chloroauric acid, and silver salt are in a molar ratio of 1:(0.22-0.67):(0.22-0.67).

Optionally, the silver salt is selected from a group of silver nitrate, silver chloride or silver acetate.

Optionally, the obtained Au—AgNCs solution is in a concentration of $2-5*10^{-4}$ mol/L.

Optionally, the heating in a water bath under darkness is carried out at temperature of 20-35 degree Celsius (° C.) for a duration of 3.5-4.5 hours (h).

Optionally, the centrifuging is carried out at a speed of 7,000-10,000 revolutions per minute (rpm) for a duration of 5-15 min, where a supernatant is obtained after centrifuging and the supernatant is filtered by a 0.22 micrometer (μm) microporous membrane.

Optionally, the extracting solution is obtained by an ultrasonic alcohol extraction process with extraction solvent being 50-100 volume percent (vol %) ethanol water solution.

Optionally, the ultrasonic alcohol extraction process includes: crushing and grinding a Lilii Bulbus sample, sieving the grind sample with 50-200 mesh sieve to obtain Lilii Bulbus powder, mixing Lilii Bulbus powder with the ethanol water solution of 50-100 vol % according to a material-liquid ratio of 1 gram (g):5-10 mL, performing ultrasonic extraction at 35-40° C. for 1.1-1.5 h to obtain a crude extract, centrifuging the crude extract at speed of 7,000-10,000 rpm for 5-15 min to obtain the supernatant, filtering the supernatant with the 0.22 μm microporous membrane to obtain the Lilii Bulbus extracting solution.

Optionally, the quality of the Lilii Bulbus to be tested includes its producing area or growth years, where the producing areas include Hunan, Lanzhou, Fujian, Jiangxi, Yunnan, Jiangsu, etc.; and the growth years is 1-8 growth years.

Optionally, the quality of the Lilii Bulbus is detected by a 96-well plate as follows:
accurately measuring extracting solutions of Lilii Bulbus of different quality from different producing areas with pipettes and water, adding the measured extracting solutions and water into the 96-well plate for incubation for 1 min; then under same concentrations, accurately measuring Lilii Bulbus extracting solutions of different quality from different producing areas, water and Au—AgNCs solution with pipettes, adding them into the 96-well plate for incubation for 1 min; later, taking pictures of the fluorescent color change of Lilii Bulbus before and after the reaction under the excitation light of 365 nm in an ultraviolet dark box by using a smartphone (model iPhone XR), where the difference of Lilii Bulbus quality is judged by visual observation at this time.

Compared with the prior art, the present application has the advantages that:
according to the present application, rapid visualized quality identification of Lilii Bulbus is achieved by taking advantage of the AIE effect caused by the combination of Au—AgNCs with active ingredients such as catechins in Lilii Bulbus, and by combining the difference in the content of active ingredients such as catechins in Lilii Bulbus of different producing areas or different growth years (quality difference) with the difference in fluorescence color (difference in color or fluorescence intensity) produced by Lilii Bulbus products of different quality; and as compared to the traditional chromatography-based detection method, the present identifying method described in the present application has the advantages of higher stability, faster response, easier operation and more portable device; the present method meets the needs of the general public with broad application prospects for industrial production.

BRIEF DESCRIPTION OF THE DRAWINGS

FIG. 1(a) and FIG. 1(b) show visual fluorescence results of before and after Lilii Bulbus from different producing areas reacting with gold-silver nanoclusters (Au—AgNCs) in Embodiment 1, where

FIG. 2(a) and FIG. 2(b) illustrate visual fluorescence results of before and after Lilii Bulbus of different growth years reacting with Au—AgNCs in Embodiment 2, where

DETAILED DESCRIPTION OF THE EMBODIMENTS

For the purpose of making the objectives, technical schemes and advantages of the present application more clearly understood, a further detailed description of the present application is given below in conjunction with embodiments. It should be understood that the specific embodiments described herein are intended only to explain the present application and are not intended to limit it.

In the following embodiments, a gold-silver nanoclusters (Au—AgNCs) solution is prepared as follows: adding 0.04 milliliter (mL) of bovine serum albumin (BSA) solution with a concentration of 50 millimoles per liter (mmol/L) into 1.56 mL of water, then sequentially adding 0.1 mL of chloroauric acid solution with a concentration of 5 mmol/L and 0.2 mL of citrate solution with a concentration of 0.5 mmol/L, uniformly mixing the solutions and adjusting the mixed solution to a pH of 6, and heating the mixed solution in a dark water bath (25 degree Celsius (° C.), 4 hours (h)), followed by fully reaction (25° C., 3 h) with 0.1 mL of silver nitrate solution with a concentration of 5 mmol/L to obtain the product of Au—AgNCs solution (concentration of $2*10^{-4}$ moles per liter (mol/L)) with red fluorescence; the prepared Au—AgNCs solution is diluted 100 times the volume with water to obtain a concentration of $2\times10^{-6}$ mol/L of Au—AgNCs solution in specific application.

The following embodiments adopt catechin standards provided by Shanghai Yuanye Bio-Technology Co., Ltd.

The following embodiments adopt the following steps to extract Lilii Bulbus samples:

crushing and grinding 1 g Lilii Bulbus sample, and sieving the grind Lilii Bulbus sample with a 50-mesh sieve to obtain Lilii Bulbus powder, mixing the Lilii Bulbus powder with ethanol water solution of 75 volume percent (vol %) according to a ratio of 1 g:6 mL, performing ultrasonic extraction at 40° C. for 1.5 h on the mixed solution to obtain a crude extract, centrifuging the crude extract at 8,000 revolutions per minute (rpm) for 15 minutes (min) to obtain a supernatant, and passing the supernatant through a 0.22 micrometer (μm) microporous membrane to obtain a Lilii Bulbus extracting solution (5.5 mL).

Embodiment 1

Figure 1A:
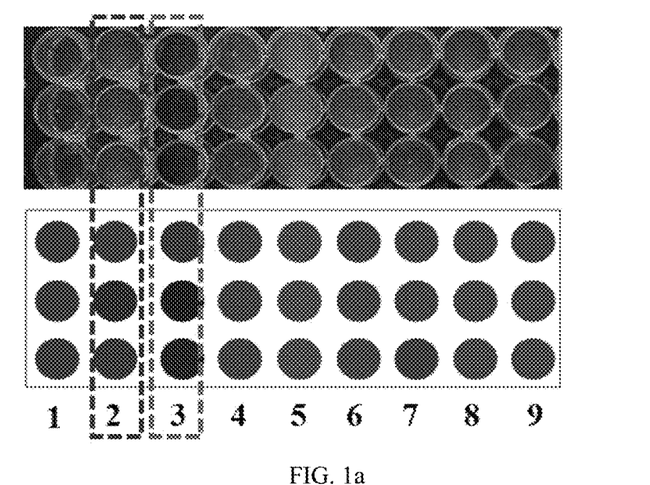
FIG. 1(a) shows a fluorescence visualization of Lilii Bulbus alone before reaction.
Figure 1B:
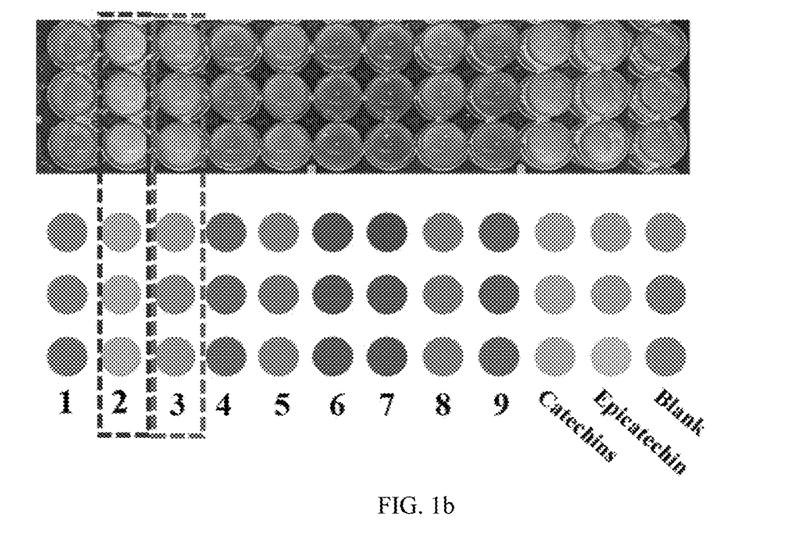
FIG. 1(b) shows the fluorescence visualization of Lilii Bulbus after reaction.

A method for visually identifying quality of Lilii Bulbus (producing area of Lilii Bulbus), including:

1) extracting Lilii Bulbus samples of nine different known producing areas (No. 1: Lilii Bulbus from Hunan province, No. 2: Longya Lilii Bulbus form Longhui of Hunan, No. 3: Lilii Bulbus form Longshan of Hunan, No. 4: Lilii Bulbus form Lanzhou of Gansu province, No. 5: Lilii Bulbus from Putian of Fujian province, No. 6: Lilii Bulbus of 8 growth years form Lanzhou of Gansu province, No. 7: Lilii Bulbus from Fuzhou of Jiangxi province, No. 8: dried Lilii Bulbus from Yunnan province, No. 9: Lilii Bulbus form Jiangsu province, and No. 10: Lilii Bulbus form Dabie Mountain of Jiangxi province, where Lilii Bulbus No. 1 was not marked with a rather specific producing area when it was purchased) separately to obtain Lilii Bulbus extracting solutions;

2) respectively mixing the obtained Lilii Bulbus extracting solutions with Au—AgNCs solution, standing the obtained mixed solutions for 3 min for reaction, and then observing the extracting solutions in terms of fluorescence color change, where a specific process includes:

a) adding 900 microliters (μL) Tris-HCl buffer solution (pH=7.0) and 100 μL of a Lilii Bulbus extracting solution of 10-fold dilution (diluted with water) prepared in step 1) into a 1.5 mL cuvette, followed by reacting of 3 min; then detecting the reacted solution against fluorescence performance to obtain fluorescence photos, obtaining RGB (red, green, and blue) values by software and plotting the values into fluorescence pictures, where FIG. 1(a) shows results of adjusting fluorescent photos and fluorescence pictures to black and white; and b) taking a 96-well microplate with a volume of 400 μL, accurately measuring 100 μL of extracting solutions of Lilii Bulbus samples of 10-fold dilution from different producing areas, 100 μL of Tris-HCl buffer solution and 100 μL of Au—AgNCs solution with a concentration of $2\times10^{-6}$ mol/L with a pipette respectively, standing the solutions for reaction for 3 min; using a smartphone (model iPhone XR) to take photos of fluorescent color change of Lilii Bulbus samples after reaction under an excitation light of 365 nanometers (nm) in an ultraviolet black box, then obtaining RGB values corresponding to photos by software and plotting fluorescent pictures; FIG. 1(b) shows results of adjusting the above-mentioned photos and fluorescent pictures of fluorescent color change to black and white, where blank group in the figure is detected as follows: accurately measuring 200 μL of Tris-HCl buffer solution and 100 μL of Au—AgNCs solution with the concentration of $2\times10^{-6}$ mol/L with a pipette, mixing the solutions and standing for reaction for 3 min; catechins group (epicatechin and catechins) is detected as follows accurately measuring 100 μL of catechin standard sample, 100 μL of Tris-HCl buffer solution and 100 μL of $2\times10^{-6}$ mol/L of Au—AgNCs solution with pipette, and then standing the solutions for reaction for 3 min.

Results of detection show that extracting solutions alone of Lilii Bulbus samples from different producing areas show weak fluorescence intensity (FIG. 1(a)), with difference of fluorescence intensity being relatively small and cannot be easily recognized by naked eyes; however, the difference of fluorescence intensity varies differently promoted by catechins in Lilii Bulbus from different producing areas responding with Au—AgNCs after Au—AgNCs is added, showing different degrees of pink, purple and blue, respectively, which are visible to the naked eyes; in the figure, Lilii Bulbus sample of Longya Lilii Bulbus from Hunan province and Lilii Bulbus sample from Lanzhou of Gansu province are both pink in color (similar to the response effect of catechin), in accordance with an genuine producing area, indicating that the above method of the present application can visually identify three high-quality producing areas, namely Longya Lilii Bulbus form Hunan (No. 2), Longshan Lilii Bulbus (No. 3) form Hunan, and Lanzhou Lilii Bulbus (No. 4) from Gansu. Though the actual color cannot be reflected because both FIG. 1(a) and FIG. 1(b) are effect plots in black and white, but a comparison of the color shades in FIG. 1(a) and FIG. 1(b) shows that the Au—AgNCs do promote significant differences in fluorescence intensity in response to the catechins in Lilii Bulbus of different producing areas after being added into the Lilii Bulbus samples, and it can be observed that the three Lilii Bulbus extracting solutions, namely Longya Lilii Bulbus (No. 2) from Hunan, Longshan Lilii Bulbus (No. 3) from Hunan, and Lanzhou Lilii Bulbus (No. 4) from Gansu, show the most similar response in terms of fluorescence intensity as compared to that of catechin standard sample after being added with Au—AgNCs.

Embodiment 2

Figure 2A:
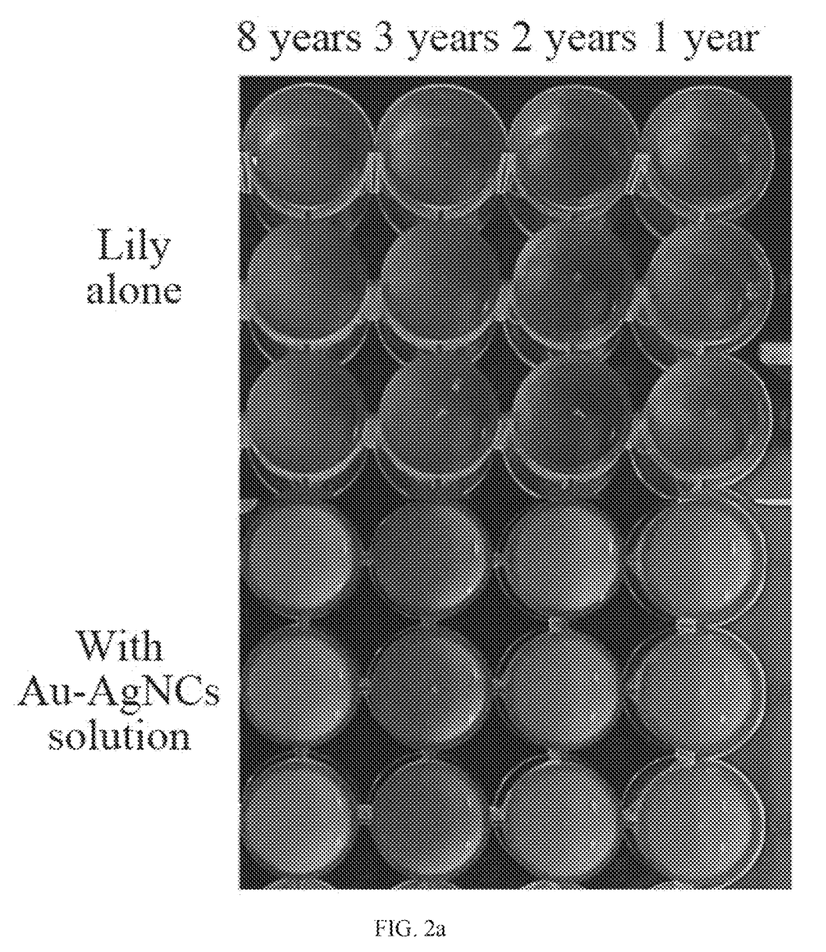
FIG. 2(a) is a fluorescence photo showing fluorescence color change before and after the reaction.
Figure 2B:
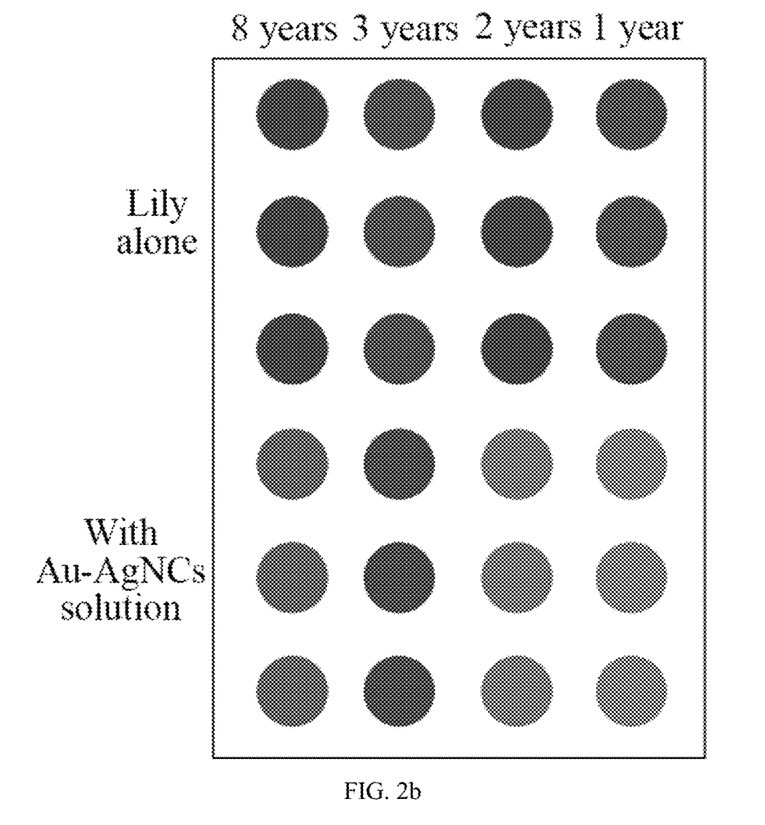
FIG. 2(b) shows the fluorescence picture plotted using RGB values obtained from corresponding fluorescence photo.

A method for visually identifying quality of Lilii Bulbus (growth year), including:

1) four batches of Lilii Bulbus samples of different growth year (Lanzhou Qilihe of 1 growth year, Lanzhou Qilihe of 2 growth years, Lanzhou Qilihe of 3 growth years, Lanzhou Lilii Bulbus of 8 growth years) are extracted respectively to obtain extracting solutions;

2) the obtained extracting solutions are respectively diluted for 10 fold with water to prepare Lilii Bulbus extracting solution of 10-fold dilution, and 100 μL of the Lilii Bulbus extracting solution of 10-fold dilution is mixed with 100 μL of Tris-HCl buffer solution and 100 μL of Au—AgNCs solution with a concentration of $2\times10^{-6}$ mol/L, and the mixed solution is reacted in a 96-well microplate with a pore volume of 400 μL for 2 min, then the Lilii Bulbus extracting solutions to be tested are observed in terms of fluorescence color change before and after the reaction under the excitation light of 365 nm in an ultraviolet dark box, and photos of the fluorescent color change of Lilii Bulbus extracting solutions before and after the reaction are taken by a smart phone (model iPhone XR), where FIG. 2(a) shows the black and white image of the fluorescence photos before and after the reaction; and FIG. 2(b) shows the black and white images of fluorescent pictures plotted using corresponding RGB values obtained from fluorescence photos with software.

Results of detection show that extracting solutions alone of Lilii Bulbus samples of different growth year show weak fluorescence intensity, with difference of fluorescence intensity being relatively small and cannot be easily recognized with naked eyes; however, visible fluorescence color changes occur after reaction with Au—AgNCs, obvious fluorescence color differences exist among Lilii Bulbus samples with different quality and different growth year, and four different Lilii Bulbus samples of different growth years form Lanzhou area are visually well identified by naked eyes; in actual fact, the Lilii Bulbus extracting solution shows fluorescence color of blue with relatively weak fluorescence intensity, and the color changes to purple after the solution is reacted with Au—AgNCs, where the shades of fluorescence colors of Lilii Bulbus of different quality and different growth years after reaction with Au—AgNCs are significantly different from each other.

Mechanistic Investigation

Figure 3A:
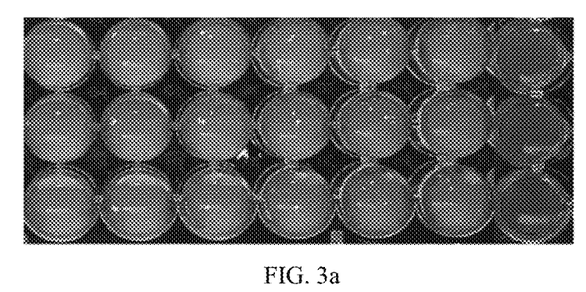
FIG. 3(a) and FIG. 3(b) show the visualized fluorescence images after the reaction between Lilii Bulbus active ingredient catechin standards of different concentrations and Au—AgNCs in Embodiment 1, where FIG. (a) is a fluorescence photo after reaction, and FIG. (b) is the fluorescence picture plotted using RGB values obtained from corresponding fluorescence photo.
Figure 3B:
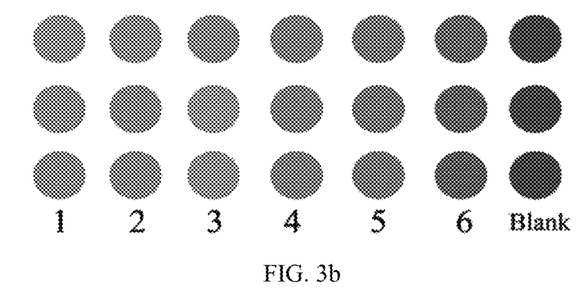

Catechin is one of the important functional components of Lilii Bulbus, and the content of catechin differs greatly among Lilii Bulbus from different producing areas; therefore, standard samples of catechins with different concentrations and Lilii Bulbus samples from different producing areas are taken for exploring the influence of different producing areas on Lilii Bulbus quality visualization, including:

the standard samples of catechins with different concentrations of $0$-$2*10^{-3}$ mol/L (specifically, $1*10^{-5}$, $2*10^{-5}$, $3*10^{-5}$, $1*10^{-4}$, $2*10^{-4}$, $3*10^{-4}$, $5*10^{-4}$, $1*10^{-3}$, $1.5*10^{-3}$, and $2*10^{-3}$ mol/L) of 100 μL are respectively mixed evenly with 100 μL Tris-HCl buffer solution and 100 μL Au—AgNCs solution, then the mixed solutions are stood for reaction for 3 min, respectively; the fluorescence color changes of the standard samples of catechins with different concentrations are observed, where FIG. 3(a) shows an blank and white effect picture of the fluorescence photos of the standard samples of catechins with different concentrations, and FIG. 3(b) shows the blank and white effect picture of the fluorescence pictures plotted using RGB values obtained from corresponding photos.

In both FIG. 3(a) and FIG. 3(b), the original concentrations (before mixing) of catechin standard solution corresponding to No. 1-No. 6 are $2*10^{-3}$, $1*10^{-3}$, $3*10^{4}$, $1*10^{4}$, $3*10^{-5}$, and $1*10^{-5}$ mol/L; and the detection solution of blank group is prepared by mixing 100 μL of Au—AgNCs solution with a concentration of $2*10^{-6}$ mol/L 200 μL of Tris-HCl buffer solution.

Results of detection show that after catechins are combined with Au—AgNCs solution, an obvious color change occurs along with the reaction, and the color changes from purple to pink as the concentration of catechins increase; as FIG. 3(a) and FIG. 3(b) are black and white effect images, the corresponding colors cannot be reflected, but it can be seen from the figures that the fluorescence effect does differ significantly when different concentrations of catechins are combined with Au—AgNCs solution.

Figure 4:
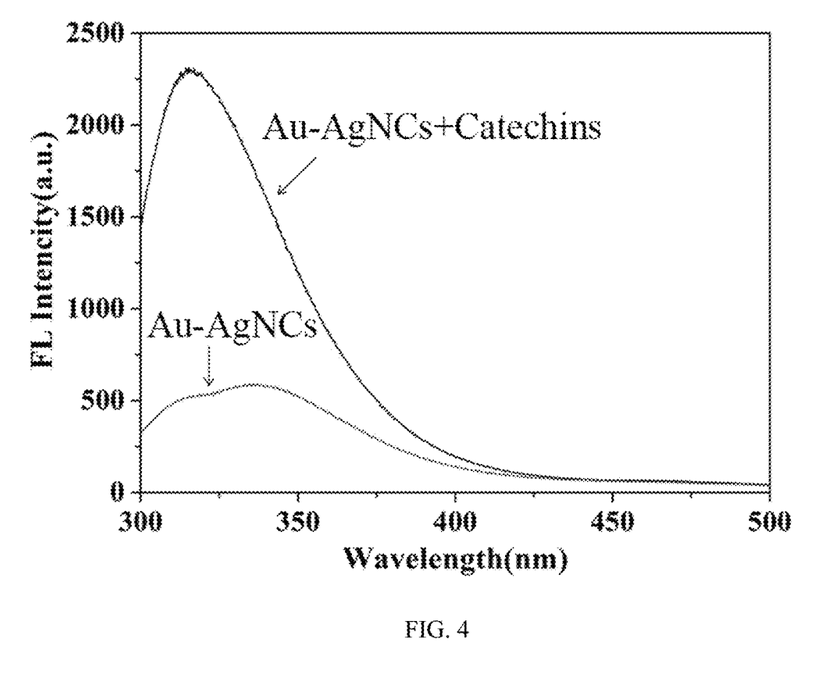
FIG. 4 illustrates the fluorescence spectra intensity before and after the reaction of catechins with Au—AgNCs in an mechanistic investigation of the method described in the present application.

FIG. 4 illustrates the fluorescence spectrum intensity of catechin standard sample before and after the reaction with Au—AgNCs; it can be seen from the figure that the fluorescence intensity shows obvious difference after Au—AgNCs response to catechins contained in Lilii Bulbus, with absorption peak being blue-shifted.

Figure 5A:
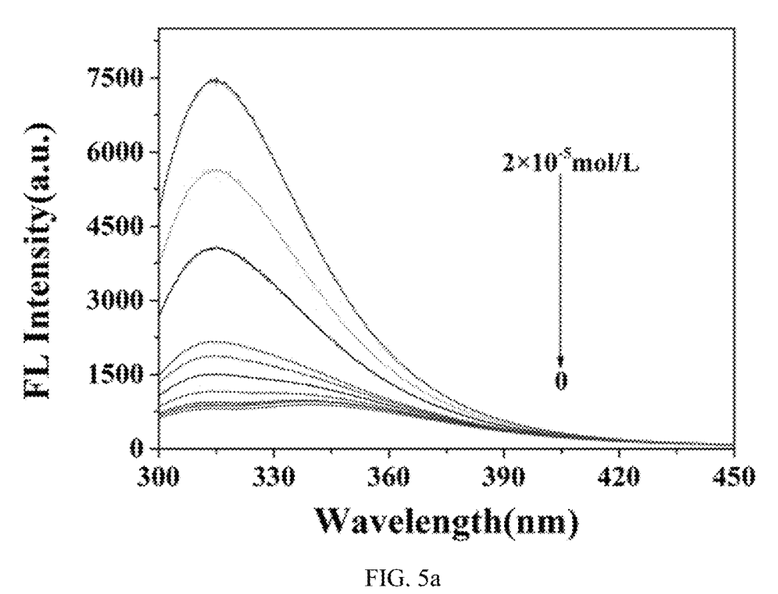
FIG. 5(a) shows fluorescence intensity after the reaction between different concentrations of catechin standards and Au—AgNCs in the mechanistic investigation of the method described in the present application.
Figure 5B:
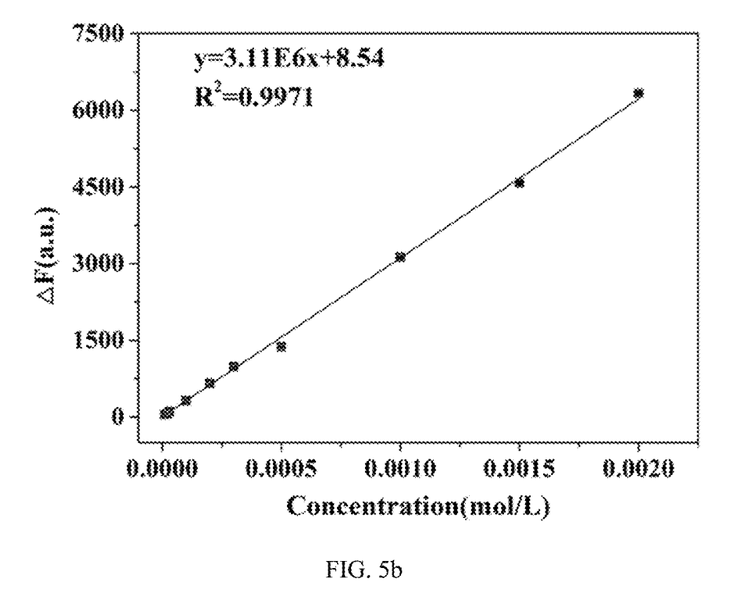
FIG. 5(b) is linear plot after the reaction between different concentrations of catechin standards and Au—AgNCs in the mechanistic investigation of the method described in the present application.

FIG. 5(a) and FIG. 5(b) show the fluorescence intensity and linear diagram after catechin standard samples with different concentrations reacting with Au—AgNCs; it can be seen from the figures that the fluorescence intensity of Au—AgNCs gradually increases as the concentration of catechins increases, and shows a good linear relation in a certain concentration range ($0.00$-$2*10^{-3}$ mol/L); it is thus concluded that the Au—AgNCs used in present application combine with the active ingredient catechins contained in Lilii Bulbus to produce an AIE effect that leads to enhanced fluorescence, which then facilitates the effective identification of Lilii Bulbus quality (different producing areas or growth years) by incorporating the differences between the catechins contained in Lilii Bulbus of different producing areas or different growth years.

The foregoing embodiments are examples made for clarity only, and are not limitations on the manner of implementation. For a person of ordinary skill in the art, other variations or changes in different forms can be made on the basis of the above description, and it is not necessary or possible to exhaust all the embodiments here, so the obvious variations or changes derived therefrom are still within the scope of protection of the present application.

What is claimed is:

1. A method for visually identifying quality of Lilii Bulbus, comprising: uniformly mixing an extracting solution of a Lilii Bulbus sample to be detected with gold-silver nanoclusters (Au—AgNCs), standing the mixed extracting solution for reaction, and realizing visual identification of Lilii Bulbus quality according to information of a color or information of fluorescence intensity of a detection system obtained after the reaction and response difference of the color or fluorescence of Lilii Bulbus samples with different quality.

2. The method according to claim 1, wherein the reaction is carried out for a duration of 1-5 minutes (min).

3. The method according to claim 1, wherein the Au—AgNCs in the detection system is in a concentration of $0.67$-$1.67\times10^{-6}$ mole per liter (mol/L); and a concentration of Lilii Bulbus components in the detection system is 3-7 milligrams per milliliter (mg/mL) in terms of Lilii Bulbus raw material introduced as preparing the extracting solution.

4. The method according to claim 1, wherein the information of color is obtained by means of visual observation or filming equipment; and the fluorescence intensity is detected by a fluorescence spectrophotometer.

5. The method according to claim 1, wherein the Au—AgNCs are prepared as follows: adding bovine serum albumin (BSA) solution into water, then sequentially adding chloroauric acid solution and citrate solution in to solution-added water, followed by adjusting pH to 4-6, heating the pH-adjusted water in a dark water bath, then adding silver salt solution into heated water for fully reaction, followed by centrifuging, and filtering, and then obtaining the Au—AgNCs solution with red fluorescence.

6. The method according to claim 5, wherein the BSA, chloroauric acid, and silver salt are in a molar ratio of 1:(0.22-0.67):(0.22-0.67).

7. The method according to claim 1, wherein the extracting solution is obtained by an ultrasonic alcohol extraction process with extraction solvent being 50-100 volume percent (vol %) ethanol water solution.

8. The method according to claim 7, wherein the ultrasonic alcohol extraction process with extraction solvent is carried out according to a material-liquid ratio of 1 gram (g):5-10 milliliters (mL) under temperature of 35-40 degree Celsius (° C.) for a duration of 1.1-1.5 hours (h).

9. The method according to claim 1, wherein the Lilii Bulbus to be tested are from different producing areas or growth years, wherein the producing areas include Hunan, Lanzhou, Fujian, Jiangxi, Yunnan, Jiangsu; and the growth years is 1-8 growth years.

* * * * *